United States Patent [19]

Luebbe, Jr.

[11] 3,932,454

[45] Jan. 13, 1976

[54] PROCESS OF MAKING HEXAGONAL ALPHA METAL-FREE PHTHALOCYANINE

[75] Inventor: Ray H. Luebbe, Jr., Rochester, N.Y.

[73] Assignee: Xerox Corporation, Stamford, Conn.

[22] Filed: Aug. 7, 1973

[21] Appl. No.: 386,468

Related U.S. Application Data

[63] Continuation-in-part of Ser. No. 846,262, July 30, 1969, abandoned.

[52] U.S. Cl. .................. 260/314.5; 96/1.5; 117/34; 117/211; 117/215
[51] Int. Cl.² ......................................... C09B 47/08
[58] Field of Search ................................ 260/314.5

[56] References Cited

UNITED STATES PATENTS 2,741,531    4/1956    Pederson .......................... 260/314.5

Primary Examiner—Harry I. Moatz
Attorney, Agent, or Firm—J. J. Ralabate; D. C. Kalasch; A. W. Karambelas

[57] ABSTRACT

A process for the preparation of substantially hexagonal crystals of metal-free alpha phthalocyanine, said crystals ranging in size from about 1 micron to about 75 microns is disclosed. Photoelectrophoretic and manifold processes employing said crystals are also disclosed.

7 Claims, No Drawings

PROCESS OF MAKING HEXAGONAL ALPHA METAL-FREE PHTHALOCYANINE

This application is a continuation-in-part of Ser. No. 846,262, filed July 30, 1969, now abandoned.

BACKGROUND OF THE INVENTION

This invention relates, in general, to a novel process for the preparation of an organic pigment and, in particular, to a process for the preparation of alpha metal-free phthalocyanine. More specifically, the invention relates to a process for the preparation of alpha phthalocyanine pigment particles ranging in size from about 1 micron to about 75 microns.

Phthalocyanine, which is also known as tetrabenzotetraazaporphin and tetrabenzoporphyrazine, may be said to be the condensation product of four isoindole groups. Metal-free phthalocyanine has the following structure:

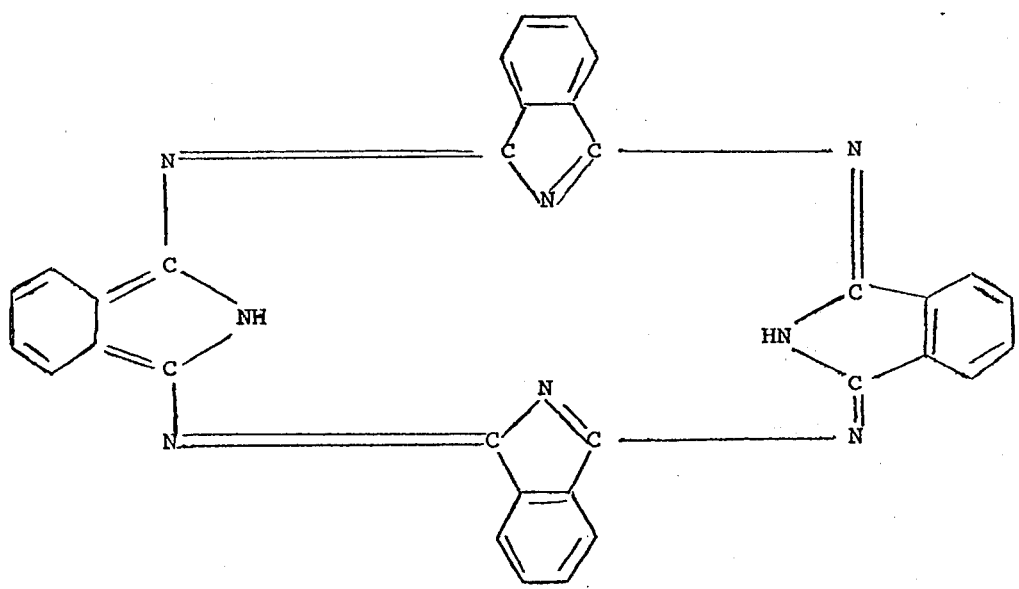

In addition to the metal-free phthalocyanine of the above structure, various metal derivates of phthalocyanine are known in which the two hydrogen atoms in the center of the molecule are replaced by metals from any group of the periodic table. Also, it is well known that from one to 16 of the peripheral hydrogen atoms in the four benzene rings of the phthalocyanine molecule may be replaced by halogen atoms and by numerous organic and inorganic groups.

Metal-free phthalocyanine is known to exist in at least three polymorphic forms, including alpha, beta, and "x-form". X-form is a newly discovered polymorphic form of phthalocyanine which has been shown to have unique xerographic properties. X-form is further discussed in a copending application, Ser. No. 375,191, filed in the United States Patent Office on June 15, 1964. The various forms of metal-free phthalocyanine may easily be distinguished by comparison of their X-ray diffraction patterns and/or infrared spectra. (See copending application, Ser. No. 505,723, filed in the United States Patent Office on Oct. 29, 1965.)

The alpha form of phthalocyanine has several important uses. For example, it has been found to be commercially useful in plastic, ink, and paint applications. Further, it is known that alpha phthalocyanine may be used alone or in conjunction with X-form phthalocyanine as a photoconductive material in xerography. In addition, it is known that the alpha form of phthalocyanine may be converted to the X-form by any suitable grinding process, such as ball milling or salt milling. Moreover, alpha phthalocyanines have found significant use in manifold imaging described in copending application Ser. No. 708,340, filed in the U.S. Patent Office on Feb. 26, 1968 and in particle migration imaging systems such as photoelectrophoresis described in U.S. Pat. No. 3,384,448 and copending application Ser. No. 560,603, filed in the U.S. Patent Office on June 27, 1966.

In a photoelectrophoretic imaging system, various colored light absorbing particles are suspended in a non-conductive liquid carrier. The suspension is placed between electrodes, subjected to a potential difference and exposed to an image. As these steps are completed, selective particle migration takes place in image configuration, providing a visible image at one or both of the electrodes. An essential component of the system is the suspended particles which must be intensely colored and electrically photosensitive and which apparently undergo a net change in charge polarity upon exposure to activating radiation, through interaction with one of the electrodes. The images are produced in color because mixtures of two or more differently colored sets of particles which are each sensitive only to light of a specific wavelength or narrow range of wavelengths are used. Particles used in this system must have both intense pure colors and be highly photosensitive.

Copending application Ser. No. 708,380 describes an imaging system utilizing a manifold sandwich comprising an electrically photosensitive material between a pair of sheets. In this imaging system, an imaging layer is prepared by coating a layer of electrically photosensitive imaging material onto a substrate. In one form the imaging layer comprises a photosensitive material such as alpha phthalocyanine dispersed in a cohesively weak insulating binder. This coated substrate is called the donor. When needed, the imaging layer is rendered cohesively weak. The process step of weakening the imaging layer is termed activation and in most cases the imaging layer is activated by contacting it with a swelling agent, solvent, or partial solvent for the imaging layer or by heating. This step may be eliminated, of course, if the layer retains sufficient residual solvent after having been coated on the substrate from a solution or paste or is sufficiently cohesively weak to fracture in response to electromagnetic radiation, normally visible light and electrical field. After activation a receiver sheet is laid over the surface of the imaging layer. An electrical field is then applied across this manifold sandwich while it is exposed to a pattern of light and shadow representative of the image to be reproduced. Upon separation of the donor substrate or sheet and receiver sheet the imaging layer fractures along the lines defined by the pattern of light and shadow to which the imaging layer has been exposed. Part of the imaging layer is transferred to one of the sheets while the remainder is retained on the other sheet so that a positive image, that is, a duplicate of the original is produced on one sheet while a negative image is produced on the other.

In the preparation of alpha phthalocyanine for use in the above-mentioned imaging systems, many difficulties have been encountered. The use of alpha phthalocyanine in particle migration systems places certain requirements on the crystal size of this material. For example, it is preferred that the alpha phthalocyanine crystals be substantially pure and of about 1 micron to about 75 microns in size. It appears that when substantially hexagonal crystals of this size are employed, color separation takes place more easily and is more complete.

The preparation of alpha phthalocyanine by previously known techniques, such as those disclosed in "Phthalocyanine Compounds" by Moser and Thomas, Rheinhold Publishing Company, pages 104–189, generate crystals of submicron size. Moreover, the use of most organic solvents for crystal growing, such as, for example, o-dichlorobenzene or dimethyl formamide, generate large crystals of the beta polymorph. While it is true that beta phthalocyanine may be converted to the alpha form by dissolving it in 98% sulfuric acid solution and precipitating the solution in ice water, sulfuric acid tends to degrade the phthalocyanine resulting in the formation of phthalimide, phthalic acid, and various nitrogen containing compounds which are undesirable in a particle migration system. Moreover, the alpha phthalocyanine which is generated is in the form of submicron particles.

It is, therefore an object of this invention to provide alpha phthalocyanine material devoid of the above-noted disadvantages.

It is another object of this invention to provide a method for the preparation of alpha phthalocyanine crystals for use in particle migration imaging systems.

Another object of this invention is to generate substantially hexagonal alpha phthalocyanine particles ranging in size from about 1 micron to about 75 microns.

Still another object of this invention is to provide a method of synthesis of alpha phthalocyanine in which the final produce is free of sulfuric acid contamination and decomposition products.

A further object of this invention is to provide improved photoelectrophoritic imaging systems.

Yet another object of this invention to provide improved manifold imagining systems.

It is still another further object of this invention to provide improved color separation in particle migration imaging systems.

SUMMARY OF THE INVENTION

The foregoing objectives and others are accomplished in accordance with this invention, generally speaking, by providing a novel system for the preparation of metal-free alpha phthalocyanine crystals, ranging in size from about 1 micron to about 75 microns which comprises placing alpha and/or beta phthalocyanine in a solution of a strong base dissolved in an aliphatic hydroxylic solvent having from 1 to 5 carbon atoms or the substituted version of said solvent and preferably, but not necessarily, heating to about reflux and allowing said crystal growing to take place.

Any suitable aliphatic hydroxylic solvent may be employed in the system of the instant invention. The aliphatic hydroxylic solvents having 1 to 5 carbon atoms may be substituted with any aliphatic, aromatic and hererocyclic radical or a combination thereof or substituents thereof. Typical aliphatic hydroxylic solvents having 1 to 5 carbon atoms include lower alcohols having 1 to 5 carbon atoms, glycols having 2 to 5 carbon atoms, and glycerol, among others.

Any suitable lower alcohol may be employed in the system of the instant invention. Typical lower alcohols include methanol, ethanol, propanol, isopropanol, tertiary butanol, pentanol, and substituted varieties thereof.

Any suitable glycol may be employed in the system of the instant invention. Typical glycols include ethylene glycol, propylene glycol, butylene glycol, pentylene glycol, and substituted vertions thereof.

Any suitable strong base may be employed in the system of the present invention. Typical strong bases include alkoxides or hydroxides of an alkali metal or quaternary ammonium radical satisfying the following formula, among others $$(R'R_{1-3}N)^+$$

wherein $R'$ may be an aromatic, heterocyclic, or aliphatic radical; and $R_{1-3}$ is any aliphatic radical.

Any suitable alkoxide may be employed in the system of the instant invention. Typical alkoxides include sodium ethoxide, potassium propoxide, and lithium butoxide.

Any suitable alkali metal may be employed in the system of the instant invention. Typical alkali metals include lithium, sodium, and potassium.

Any suitable quaternary ammonium salt may be employed in the system of the instant invention. Typical quaternary ammonium salts include tetramethyl ammonium hydroxide or alkoxide, benzyltrimethyl ammonium hydroxide or alkoxide, among others.

Any suitable substituted or unsubstituted metal-free phthalocyanine may be used in this invention. While either alpha metal-free phthalocyanine, beta metal-free phthalocyanine, or mixtures thereof may be placed in the solvent, best results are obtained with alpha metal-free phthalocyanine.

The metal-free phthalocyanine should remain in the solvent solution above described for a period long enough to produce crystals ranging in size from about 1 micron to about 75 microns. A preferred period is from about 4 to about 8 days without heat and shorter periods of time when heating the material up to reflux temperature.

DESCRIPTION OF PREFERRED EMBODIMENTS

The following examples will further define various preferred embodiments of the present invention. Parts and percentages are by weight unless otherwise specified.

EXAMPLE I

Approximately 30 g. of sub-micron-sized particles of beta metal-free phthalocyanine are placed in a solution containing about 30 g. of potassium propoxide in about 170 ml. of propanol. The material is heated to about reflux and after a short period of time, there results substantially hexagonal crystals of alpha metal-free phthalocyanine ranging in size from about 1 micron to about 75 microns.

EXAMPLE II

Example I is repeated using alpha metal-free phthalocynine in place of beta metal-free phthalocyanine. The solution is not heated, but allowed to stand for about 5 days. There results substantially hexagonal crystals of metal-free alpha phthalocyanine ranging in size from about 1 micron to about 75 microns.

EXAMPLES III – IV

Example I is repeated using alpha metal-free phthalocyanine in place of the beta form and Example II is repeated using the beta polymorph in place of the alpha form. In each case alpha metal-free crystals, ranging in size from about 1 micron to about 75 microns are generated.

EXAMPLES V – VII

Example I is repeated three successive times using sodium ethoxide in ethanol, potassium propoxide in propanol, and lithium butoxide in butanol, respectively. Results are substantially the same as those of Example I.

In each of Examples VIII – X, below, a suspension including equal amounts of three colored pigments is made by dispersing the pigments in Sohio Odorless Solvent 3440 so that the pigments constitute 8% by weight of the mixture. The mixture may be referred to as a "tri-mix". The tri-mixing are individually tested by coating them on a NESA glass plate and exposing them as in Example I of U.S. Pat. No. 3,384,488 except that a multi-color "Kodachrome" transparency is used in place of the black-and-white transparency. Thus, a multi-colored image is projected on the plate as the roller electrode is moved across the surface thereof. A baryta paper blocking electrode is employed and the roller is held at a negative potential of about 2,500 volts. The roller is passed over the plate 6 times, with removal of adhering particles from the blocking electrode surface between passes. After completion of the 6 passes, the quality of the image upon the plate is evaluated as to the image density and color purity.

EXAMPLE VIII

The tri-mix comprises alpha metal-free phthalocyanine prepared in Example I, crystal size about 1 micron to about 75 microns, a yellow pigment-Indofast Yellow Toner, flavanthrone, C.I. No. 70600, available from Harmon Colors Co. and a magenta pigment, Watchung Red B, a barium salt, of 1-(4'-methyl-5'-chloroazobenzene-2-sulfonic acid)-2-hydroxy-3-naphthoic acid, C.I. No. 15865, available from E. I. duPont deNemours & Co. When exposed as discussed above, this tri-mix produces a multi-color image corresponding to the original, having very good color density characteristics and exceptionally good color separation.

EXAMPLE IX

Example VIII is repeated with a tri-mix comprising alpha phthalocyanine prepared in Example II, crystal size about 1 micron to about 75 microns, a yellow pigment, N-2" (1",3" thiazole)-8-13-dioxodinaphtho-(1,2-2',3') furan-6-carboxamide, and a magenta pigment, Quindo magenta RV-6803, a quinacridone-type pigment, available from Harmon Colors. As in Example VIII the density characteristics and color separation are excellent.

EXAMPLE X

Example VIII is repeated with a tri-mix comprising alpha phthalocyanine prepared in Example III, crystal size about 1 micron to about 5 microns, a yellow pigment, Algol Yellow GC, 1,2,5,6-di (C,C'-diphenyl)-thiazole-anthraquinone, C.I. No. 67300, available from General Dyestuffs, Bonadur Red B, and insolubilized azo dye available from Collway Colors, C.I. No. 15865. As in Example VIII the density characteristics and color separation are excellent.

EXAMPLES XI–XIV

A manifold imaging layer is made as follows: 5 grams of Sunoco 1290, a microcrystalline wax with a melting point of 178°F. is dissolved in 100 cc. of reagent grade petroleum ether heated to about 50°C. and quenched by immersing the container in cold water to form small wax crystals. 5 grams of the alpha metal-free phthalocyanine produced according to Example I (about 1 micron to about 75 microns in size) are then added to the wax paste along with ½ pint of clean porcelain balls in a 1 pint mill jar. This formulation is then ball milled in darkness for 3½ hours at 70 r.p.m. and after milling 20 cc. of Sohio Solvent 3440 is added to the paste. This paste is then coated in subdued green light on a 2 mil Mylar sheet with a No. 12 wire-wound draw down rod which produces a 2.5 micron thick coating after drying. The same paste is also applied on three other Mylar sheets with a No. 8 draw down rod to produce a coating thickness of 1½ microns, with a No. 24 rod to produce a coating thickness of 5 microns and a No. 36 rod to produce a coating thickness of 7½ microns. Each of these coatings is then heated to about 140°F. in darkness in order to dry it. Then the coated donors are placed on the tin oxide surface of NESA glass plates with their coatings facing away from the tin oxide. A receiver sheet also of 2 mil thick Mylar is then placed on the coated surface of each donor. Then a sheet of black, electrically conductive paper is placed over the receiver sheet to form the complete manifold set. The receiver sheet is then lifted up and the phthalocyanine wax layer is activated with one quick brush stroke of a wide camel's hair brush saturated with petroleum ether. The receiver sheet is then lowered back down and a roller is rolled slowly once over the closed manifold set with light pressure to remove excess petroleum ether. The negative terminal of an 8,000 volt d.c. power supply is then connected to the NESA coating in series with a 5,500 black opaque electrode and grounded. With the voltage applied, a white incandescent light image is projected upward through the NESA glass using a Wollensak 90 mm, f 4.5 enlarger lens with illumination of approximately 1/100 foot-candle applied for 5 seconds for a total incident energy of 20.0 foot-candle-seconds. After exposure, the receiver sheet is peeled from the set with the potential source still connected. The small amount of petroleum ether present evaporates within a second or so after separation of the sheets yielding a pair of excellent quality images with a duplicate of the original on the donor sheet and a reversal of the original on the receiver sheet. All four coating thicknesses produce very good quality images.

EXAMPLES XV – XVI

Example XI is repeated two successive times using the alpha metal-free phthalocyanines of Example II, and III, respectively. In each case there results excellent quality images.

EXAMPLE XVII

About 30 grams of sub-micron size particles of alpha metal-free phthalocyanine are placed in a solution containing about 30 grams of potassium hydroxide in about 170 ml of ethylene glycol. The material is heated to about reflux and after a short period of time there results substantially hexagonal crystals of alpha metal-free phthalocyanine ranging in size from about 1 micron to about 75 microns.

EXAMPLE XVIII

Approximately 30 grams of sub-micron size particles of alpha metal-free phthalocyanine are placed in a solution containing about 30 grams of sodium hydroxide and about 170 ml of ethanol. The material is heated to about reflux and after a short period of time there results substantially hexagonal crystals of alpha metal-free phthalocyanine ranging in size from about 1 micron to about 75 microns.

EXAMPLE XVIV

Approximately 30 grams of sub-micron size particles of alpha metal-free phthalocyanine are placed in a solution containing about 30 grams of potassium hydroxide and about 170 ml of ethanol. The material is heated to about reflux and after a short period of time there results substantially hexagonal crystals of alpha metal-free phthalocyanine ranging in size from about 1 micron to about 75 microns.

EXAMPLE XX

The procedure as outlined in Example XVII is again repeated with the exception that 30 grams of tetramethyl ammonium hydroxide in about 170 ml of glycerol are employed. Similar results as obtained in Example XVII are obtained.

EXAMPLE XXI

The procedure as outlined in Example XVII is again employed with the exception that 30 grams of benzyltrimethyl ammonium hydroxide are employed in about 170 ml of isopropanol. Similar results as obtained in Example XVII are again obtained.

Although specific components and porportions have been stated in the above description of preferred embodiments of the invention, other typical materials as listed above if suitable may be used with similar results. In addition, other materials may be used to synergize, enhance or otherwise modify the properties of the imaging layer. For example, various dyes, spectral sensitizers, complexes, and electrical sensitizers such as Lewis Acids may be added to aid in particle migration imaging.

Other modifications and ramifications of the present invention will occur to those skilled in the art upon a reading of the present disclosure. These are intended to be included within the scope of this invention.

What is claimed is:

1. A method for the preparation of substantially hexagonal crystals of alpha metal-free phthalocyanine, said crystals ranging in size from about 1 micron to about 75 microns which comprises mixing a phthalocyanine selected from the group consisting of unsubstituted alpha metal-free phthalocyanine, unsubstituted beta metal-free phthalocyanine, and mixtures thereof in a solution of a strong base selected from at least one member of the group consisting of alkoxides of an alkali metal, hydroxides of an alkali metal, alkoxides of a quaternary ammonium radical, and hydroxides of a quaternary ammonium radical satisfying the following formula
$$(R'R_{1-3}N)^+$$
wherein $R'$ may be an aromatic, heterocyclic, or aliphatic radical; and $R_{1-3}$ is an aliphatic radical 2. The method as defined in claim 1 wherein said aliphatic hydroxylic solvent is at least one member selected from the group consisting of alcohols having 1 to 5 carbon atoms, glycols having 2 to 5 carbon atoms, and glycerol.

3. The method as defined in claim 1 wherein said alkali metal is selected from at least one member of the group consisting of lithium, sodium, and potassium.

4. The method as defined in claim 2 wherein said alcohol is selected from the group consisting of methanol, ethanol, propanol, isopropanol, tertiary butanol, and pentanol.

5. The method as defined in claim 1 wherein the phthalocyanine solvent mixture is allowed to stand for about 5 days to about 7 days.

6. The method as defined in claim 1 wherein said phthalocyanine solvent mixture is heated up to about reflux temperature.

7. The method as defined in claim 2 wherein said alpha metal-free phthalocyanine crystals are submicron in size.

* * * * *